US012808679B2

(12) United States Patent
Cummings

(10) Patent No.: US 12,808,679 B2
(45) Date of Patent: Nov. 24, 2026

(54) PEDESTRIAN-ORIENTED NAVIGATION APP FOR MOBILE DEVICE

(71) Applicant: Joe Cummings, College Park, GA (US)

(72) Inventor: Joe Cummings, College Park, GA (US)

(*) Notice: Subject to any disclaimer, the term of this patent is extended or adjusted under 35 U.S.C. 154(b) by 0 days.

(21) Appl. No.: 19/179,228

(22) Filed: Apr. 15, 2025

(65) Prior Publication Data

US 2026/0160573 A1 Jun. 11, 2026

Related U.S. Application Data

(63) Continuation of application No. 18/100,268, filed on Jan. 23, 2023, now Pat. No. 12,287,220.

(60) Provisional application No. 63/303,080, filed on Jan. 26, 2022.

(51) Int. Cl.
*G01C 21/36* (2006.01)

(52) U.S. Cl.
CPC ..... *G01C 21/3632* (2013.01); *G01C 21/3626* (2013.01)

(58) Field of Classification Search
CPC ........................ G01C 21/3632; G01C 21/3626
See application file for complete search history.

(56) References Cited

U.S. PATENT DOCUMENTS 5,243,528 A * 9/1993 Lefebvre .............. G01C 21/367 701/429
5,550,538 A * 8/1996 Fujii ................ G08G 1/096827 340/990
5,659,476 A * 8/1997 LeFebvre ........... G01C 21/3415 701/417
6,418,373 B1 * 7/2002 Omi ................... G01C 21/3484 340/995.22
6,456,934 B1 * 9/2002 Matsunaga ........ G01C 21/3492 701/411
12,287,220 B1 4/2025 Cummings
2010/0123737 A1 * 5/2010 Williamson ............ G06T 15/20 345/672

(Continued)

OTHER PUBLICATIONS

Cummings, Joe; Non-Final Office Action for U.S. Appl. No. 18/100,268, filed Jan. 23, 2023, mailed Oct. 7, 2024, 8 pgs.

(Continued)

*Primary Examiner* — Tan Q Nguyen
(74) *Attorney, Agent, or Firm* — Smith, Gambrell & Russell, LLP

(57) ABSTRACT

Methods, apparatuses, and computer-readable media for providing a pedestrian-oriented navigation app for a mobile device. Destination information is received from a pedestrian using a mobile device. The mobile device retrieves pedestrian-oriented mapping data and routing for the navigation of the pedestrian to the destination, determines a current location and direction of the pedestrian based upon GPS data and compass data retrieved from the device, and displays the current location and direction of the pedestrian along with a route for the pedestrian to the destination on the user interface of the mobile device based on the pedestrian-oriented mapping data and routing. If the mobile device detects that the pedestrian has deviated from the route, the mobile device alters the display on the user interface to alert the pedestrian to the deviation.

20 Claims, 8 Drawing Sheets

(56) References Cited

U.S. PATENT DOCUMENTS

| | | | | |
|---|---|---|---|---|
| 2012/0303264 | A1* | 11/2012 | Su | G01C 21/3629 701/416 |
| 2013/0103200 | A1 | 4/2013 | Tucker et al. | |
| 2015/0323341 | A1 | 11/2015 | Farrell et al. | |
| 2018/0094943 | A1* | 4/2018 | Grochocki, Jr. | G01C 21/3492 |
| 2019/0368890 | A1 | 12/2019 | Keen et al. | |
| 2020/0124420 | A1* | 4/2020 | Andreuzzi | A61H 3/061 |
| 2020/0410406 | A1* | 12/2020 | Leary | G01C 21/3423 |
| 2025/0137798 | A1 | 5/2025 | Cummings | |

OTHER PUBLICATIONS

Cummings, Joe; Notice of Allowance for U.S. Appl. No. 18/100,268, filed Jan. 23, 2023, mailed Mar. 4, 2025, 5 pgs.

* cited by examiner

400

PEDESTRIAN-ORIENTED NAVIGATION APP FOR MOBILE DEVICE

CROSS-REFERENCE TO RELATED APPLICATIONS

This application is a continuation of U.S. patent application Ser. No. 18/100,268, filed Jan. 23, 2023, and entitled "PEDESTRIAN-ORIENTED NAVIGATION APP FOR MOBILE DEVICE," issued as U.S. Pat. No. 12,287,220 on Apr. 29, 2025, which claims the benefit of U.S. Provisional Application No. 63/303,080 filed on Jan. 26, 2022, and entitled "PEDESTRIAN-ORIENTED NAVIGATION APP FOR MOBILE DEVICE," the entire disclosures of which are hereby incorporated herein by these references.

BRIEF SUMMARY

The present disclosure relates to technologies for providing a pedestrian-oriented navigation app for a mobile device. According to some embodiments, one method for providing instructions to a pedestrian on a mobile device for navigating to a destination includes receiving destination information from the pedestrian and accessing pedestrian-oriented mapping data and routing for the navigation of the pedestrian to the destination based on the destination information. The mobile device then determines a current location and direction of the pedestrian based upon GPS data and compass data retrieved from the mobile device and displays the current location and direction of the pedestrian along with a route for the pedestrian to the destination on the user interface of the mobile device based on the pedestrian-oriented mapping data and routing. If the mobile device detects that the pedestrian has deviated from the route, the mobile device alters the display on the user interface to alert the pedestrian to the deviation.

According to further embodiments, a computer-readable medium is encoded with computer-executable instructions that, when executed by a processor of a mobile device, cause the mobile device to receive destination information from a pedestrian utilizing a user interface of the mobile device and access pedestrian-oriented mapping data and routing for navigation of the pedestrian to a destination based on the received destination information. The mobile device then determines a current location and direction of the pedestrian based upon GPS data and compass data retrieved from the mobile device and displays the current location and direction of the pedestrian and a route for the pedestrian to the destination on the user interface based on the pedestrian-oriented mapping data and routing. The mobile device detects whether the pedestrian has deviated from the route based upon the current location and direction of the pedestrian, and if deviation from the route is detect, alters the display on the user interface to alert the pedestrian to the deviation.

According to further embodiments, a mobile device comprises a processor, a display, a GPS module, a compass module, and a memory. The display is operably connected to the processor and configured to present a user interface to a user of the mobile device. The GPS module and compass module are operably connected to the processor and configured to provide a current location and current direction, respectively, of the mobile device to the processor. The memory is operably connected to the processor and contains computer-executable instructions that, when executed by the processor, cause the mobile device to receive destination information from the user utilizing the user interface and access pedestrian-oriented mapping data and routing for navigation of the user to a destination based on the received destination information. The mobile device then retrieves the current location and direction of the mobile device from the GPS module and the compass module and displays the current location and direction of the mobile device and a route for the user to the destination on the user interface based on the pedestrian-oriented mapping data and routing. The mobile device can detect whether the user has deviated from the route based upon the current location and direction of the mobile device, and upon detecting a deviation, alter the display on the user interface to alert the user of the deviation.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale, and any measurements provided are shown to provide a relative size context and are not intended to be limiting. Like numerals represent like elements throughout the several figures.

DETAILED DESCRIPTION

Figure 1:
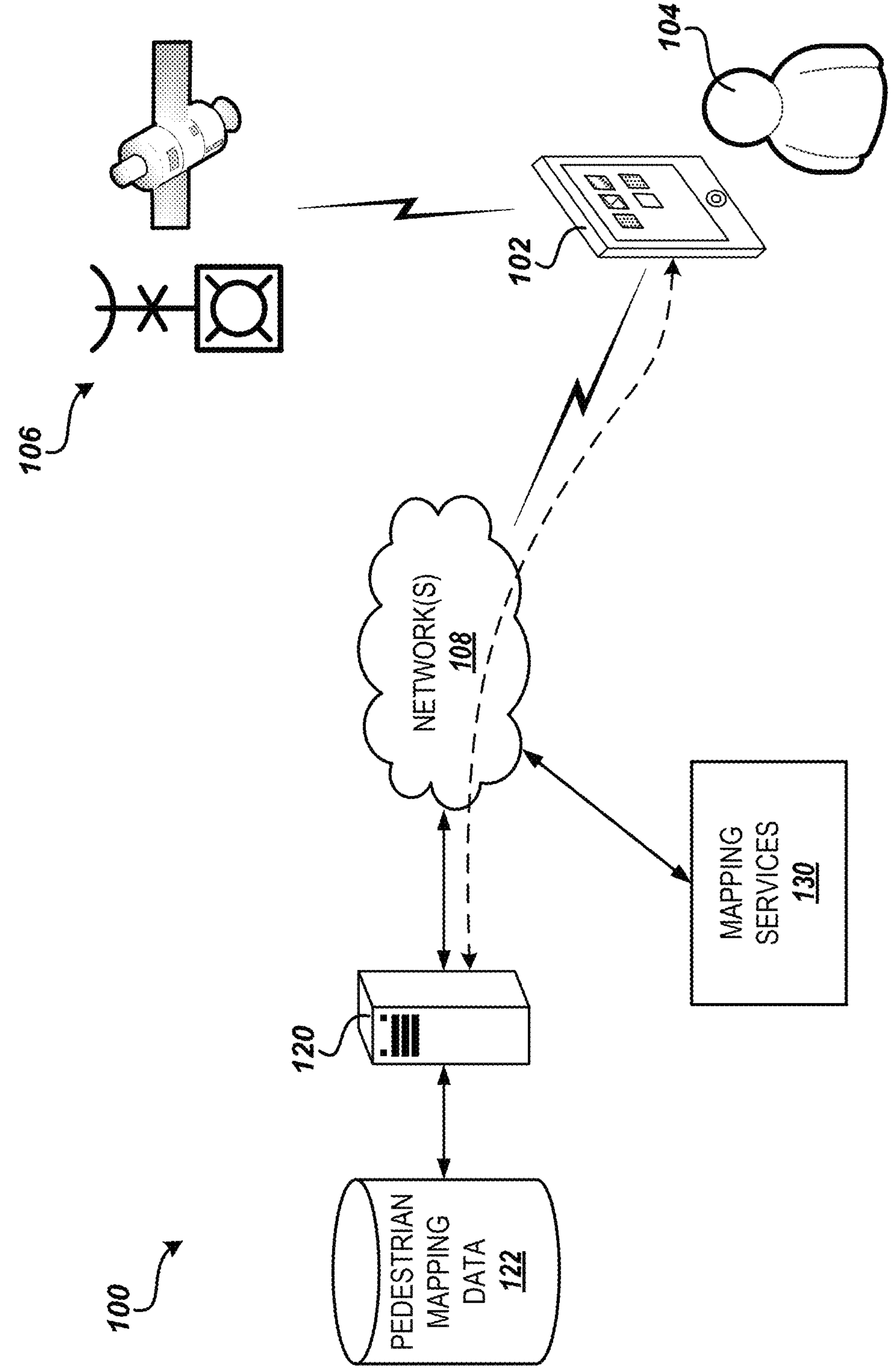
FIG. 1 is a system diagram showing the components of a pedestrian-oriented navigation system, according to embodiments presented herein.

The present disclosure relates to technologies for providing a pedestrian-oriented navigation app for a mobile device. Current navigation apps for mobile phones are designed to operate primarily for driving on streets. Even apps that offer "walking directions" utilize streets for routing and don't give users access to pedestrian walkways, cut-throughs, indoor paths, parking lots and parking decks, etc. In addition, the current apps don't provide real-time feedback to pedestrians sufficient for them to navigate efficiently to the destination, instead providing street-level routes with initial instructions frequently comprising "Proceed to the route."

Utilizing the technologies described herein, a navigation app may be designed and implemented for mobile phones that utilizes pedestrian-oriented data and routing, including outdoor and indoor pedestrian routes, walkways, sidewalks, streets, escalators, elevators, etc. The app may access maps and layouts of parks, zoos, shopping malls, and other locations with walkways and sidewalks identified, as well as entry/exit points, transitions, escalators, steps, stairs, elevators, ramps, and the like along with elevation information and elevation changes.

The app may further provide real-time feedback for pedestrians following the routes. According to embodiments, if a pedestrian deviates from the route to their selected destination, the app will indicate the deviation in real-time, e.g., by coloring the route/path in red and/or providing a text and/or voice message. The app may also provide real-time instruction on how the pedestrian should move to correct the wrong path. When the pedestrian returns to the right path, the app may indicate so by, e.g., coloring the route/path green. Directions to the starting point of a route may include instructions to turn left or right, move forward, left, right, up, down, or as required to follow the route, according to the maps/layouts accessed. The app may therefore facilitate efficient walking for pedestrians on a campus or in a metropolitan area while eliminating the initial "Proceed to the route" directive.

According to various embodiments, the following functions and features may be implemented in a pedestrian-oriented navigation app (also referred to herein as the "app") to improve pedestrian navigation. As used herein, "pedestrian" may refer to both people currently navigating by walking as well as an operator of a vehicle intending to park and walk to the final destination:

- Location of pedestrian may be captured by phone/mobile device from GPS and compass. Marking of location and direction with instructions and needed adjustments will be based on pedestrian's exact location and accurate maps/layouts of surrounding areas.
- Directions/Instructions may be communicated/sent to pedestrian via on-screen text message/voice, based on settings specified by pedestrian.
- App may include ability/capability to direct pedestrians inside large facilities, such as airports, hospitals, museums, and the like, while indoors or outdoors.
- When either indoors or outdoors, pedestrians may be directed to point of beginning route via date from accurate maps/layouts, building plans, and the like, imported or accessed over the Internet.
- When pedestrian is outside, the app may automatically confirm the pedestrian's location via compass and high-resolution GPS signals, including GPS L5 band.
- Whether pedestrian is inside or outside, confirmation that they are on correct path may be shown in real-time, such as a green path route, and when they are on the wrong route/path, the display may be updated to be a, e.g., red path. When the wrong path/route is detected, correctional instructions may be sent via voice and/or on-screen test messages (based on pedestrian settings).
- Maps/layouts, building plans, etc. may be utilized to better guide pedestrians. If elevations/levels are included, the instructions may further provide routing instructions to change levels, using escalators, elevators, and the like.
- App navigation may include guiding pedestrians to public transportation points, and when inside train/bus stations, entry and exit points, in accordance with the currently selected destination.
- After app receives permission to access compass on the mobile device, the app may be enabled to mark locations without the need of GPS data. Since the compass and/or some combination of other location tracking sources, such as an accelerometer onboard the device, location beacons, cell towers, Wi-fi access points, and the like are accurate both inside and outside, the pedestrian can be guided to their vehicles in garage and parking decks, because the floor level may be calculated from compass elevation data (deck floor levels averaging between 10.5 and 11.5 ft. in height).
- App may utilize the phone/mobile device's own GPS receives to provide driving instructions that will interact with the device's compass to ensure accuracy.
- If or when an agreement is not reached to access building/structure/facility layouts or design plans, tax records or other public records may be utilized by the app to guide pedestrian to entry/exit points and other locations of their choosing.
- When GPS information, GIS data, or other sources, accessible through public APIs, provides landmarks, signage info, or any other identifying information that is likely to assist the pedestrian and to simplify movements/actions, that information may be delivered to pedestrian in visual images, text, and/or voice message, according to the pedestrian's settings in the app.
- When the pedestrian chooses a destination, they may be provided with the option to view restaurants, landmarks, historical places, and or other additional locations of their choosing that are on their route/path or near or adjacent to their route/path.
- When the pedestrian is selecting the destination, the app may have access to data search for destination by landmark name, business name and why according to public records, GPS, or other data sources.
- The app's corrective messages may appear on screen in an automatic manner, mirroring how messages show up when some sites are visited.
- For urban environments, the app will simplify using compass and GPS readings to inform pedestrians via rapid communication regarding their movement concerning corrections that may be needed in both their position (GPS coordinates) and the direction that they are facing (compass).
- To provide complete directions to a destination, the app will use compass elevation measurements, public/government maps, and topographical records to ensure that pedestrians are guided on main level streets as well as lower level streets.
- Just as with pedestrians, the app may have the capability to guide users who are vehicle operators in a manner that alerts them when they are going right or wrong.
- When vehicle operators are at single direction lanes of driveways and movement is in the wrong direction, they will receive immediate correction.
- The app may use public property records, such as plat maps and survey records, to guide and inform vehicle operators and pedestrians of retail owners'names and other information that will be useful to enhance their ability to arrive at their destination with ease. For example, if a vehicle operator is in the parking lot of a major/large retailer, such as Target or Walmart, instead of directing the operator to "Proceed to the route" (which may include a street name), the app will utilize parking lot/property records or layout plans to start giving instructions to the vehicle operator while they are still in the parking lot in regard to direction of travel.

FIG. 1 show an overview of a system 100 for implementing a pedestrian-oriented navigation app. According to embodiments, the system 100 includes a mobile device 102 operated by an end-user or "pedestrian" 104. For example, the mobile device 102 may represent a mobile phone or tablet device, such as an IPHONE® or IPAD® from Apple Inc. or an Android™ phone from Google LLC. The pedestrian-oriented navigation app (the "app") executes on the pedestrian's mobile device 102. According to embodiments, the app determines the current location and direction/orientation of the mobile device based on embedded GPS and compass modules that source location and direction data from GPS satellites, locator beacons, and the like (as shown at 106). The app may further use other location information from an onboard accelerometer, connected Wi-fi access points, imaging data extracted from the device's camera, and the like.

The app further connects to a mapping service executing on cloud server 120 over one or more networks 108, such as a 5G or LTE cellular data network and/or the Internet. The cloud server 120 may represent virtualized computing resources available in the cloud, such as Amazon EC2 Cloud Computing services. In further embodiments, the cloud server 120 may represent one or more of conventional web server, application server, and/or other application hosting environments executing on one more server computers. According to further embodiments, the cloud server 120 is connected to a database or datastore containing pedestrian-oriented mapping data 122. The pedestrian-oriented mapping data 122 may include street maps with pedestrian walkways, sidewalks, and the like; building floorplans with entry and exit points, stairs, escalators, elevators, elevation information, parking lot/deck layouts with level/elevation information and pedestrian paths/walkways, public transportation maps with station floorplans and entry/exit points associated with common destinations identified, GIS data, and other pedestrian-oriented mapping data that the cloud server 120 may provide to the app executing on the mobile device 102 to facilitate navigation of the pedestrian 104 to a selected destination. In addition, the mobile device 102 and/or cloud server 120 may have access to other mapping services 130 over the network(s) 108 to source mapping data.

Figure 2:
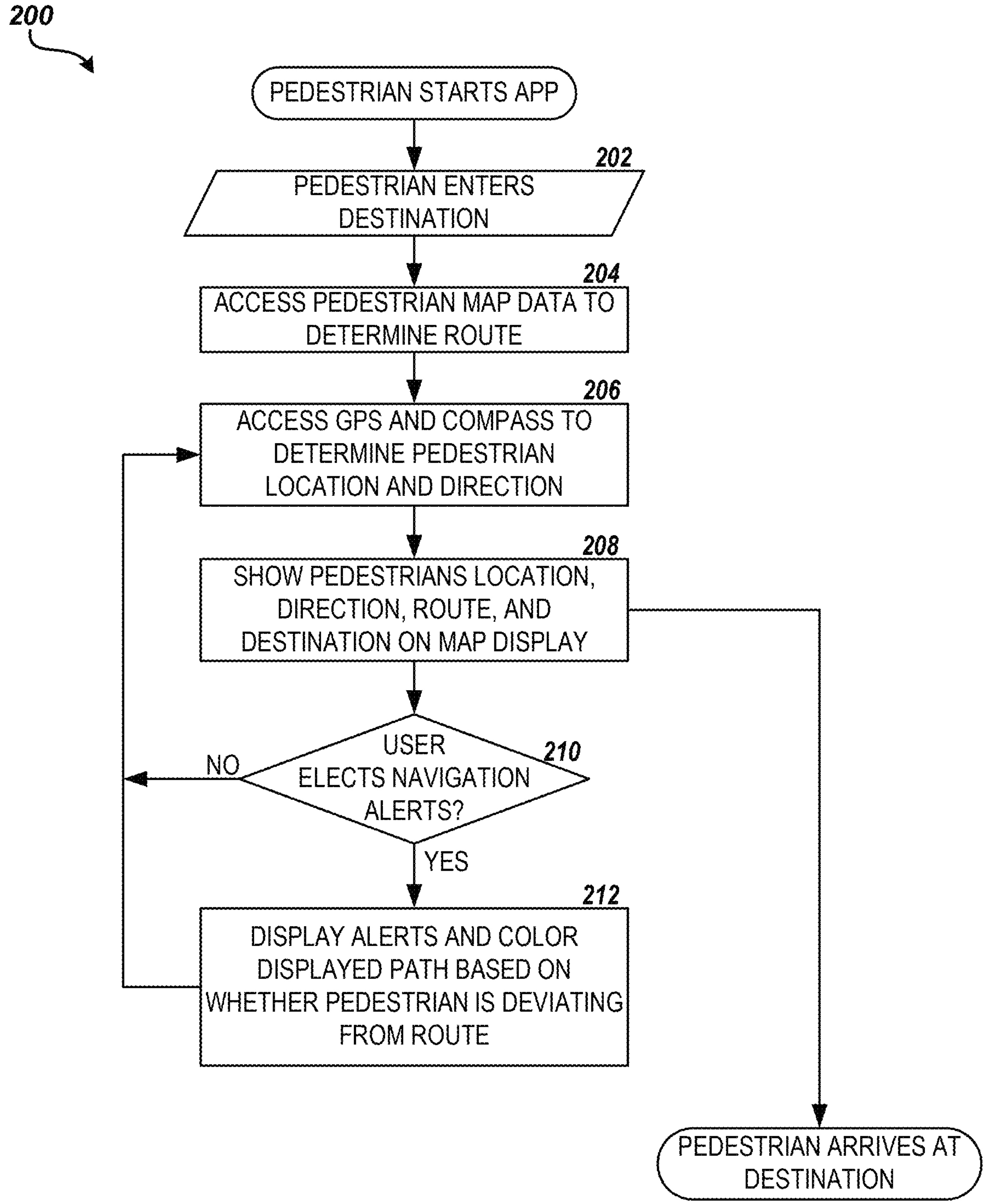
FIG. 2 is a flow chart showing an exemplary routine providing pedestrian-oriented navigation to a pedestrian utilizing a mobile device, according to embodiments presented herein.

FIG. 2 illustrates one routine 200 for providing pedestrian-oriented navigation to a pedestrian 104 utilizing a mobile device 102. In some embodiments, the steps of the routine 200 may be performed by the app executing on the mobile device 102 in conjunction with the cloud server 120. In other embodiments, the routine 200 may be performed by some combination of the mobile device 102, the cloud server 120, and/or other computing devices, components, and modules of the pedestrian-oriented navigation system 100. According to some embodiments, the routine 200 may be initiated by a pedestrian 104 starting the app on their mobile device 102, for example.

The routine 200 begins at step 202, where the pedestrian enters a destination into the app. The app then accesses pedestrian-oriented mapping data to determine a route for the pedestrian to the destination, as shown at step 204. For example, the app may access the pedestrian-oriented mapping data 122 described above through the cloud server 120, to retrieve streets, sidewalks, pedestrian walkways, and the like from which to build the route. The app may also retrieve steps, stairs, elevators, escalators, ramps, and the like long with the elevation changes caused by these to provide a three-dimensional route. At step 206, the app retrieves location and direction information from the compass and/or GPS of the mobile device 102. In addition, the app may further utilize elevation information from the compass and/or GPS of the mobile device 102.

From step 206, the routine 200 proceeds to step 208, where the app then displays the current location of the mobile device 102 on a map display, along with a route to the destination entered by the pedestrian and the direction the pedestrian is facing/moving. According to embodiments, the app may access the compass module of the mobile device 102 which provides the direction information. The route may include both a line on the map display as well as text instructions, such as left or right turns and slants based on GPS coordinates and compass direction. The app may provide immediate instructions to the pedestrian to the starting point of the route including instructions to turn left or right, move forward, left, right, up, down, or as required to follow path according to the maps/layouts accessed. The elevation information may further allow the app to provide instructions/direction to the pedestrian 104 to move up and down levels of a structure, such as levels of a parking deck.

At step 210, if the pedestrian 104 has selected navigation alerts in the app, the app will provide alerts and alter display of location, route, and/or direction on the map display if the pedestrian deviates from the route, as shown at step 212. For example, if the pedestrian deviates from the indicated route, or is facing/moving the wrong direction to start the route, the app may color the pedestrian's path in red. The app may further provide real-time text instructions, such as turn left or right, move forward, left, right, up, down, and the like to return to the correct route. Once the pedestrian 104 returns to the route, the user may change the color of pedestrian's path, the route, the destination, and or other elements on the display to green, to indicate the pedestrian is back on track. The routine 200 ends when the mobile device 102 arrives at the destination, or when the app is terminated on the pedestrian 104.

Figure 3:
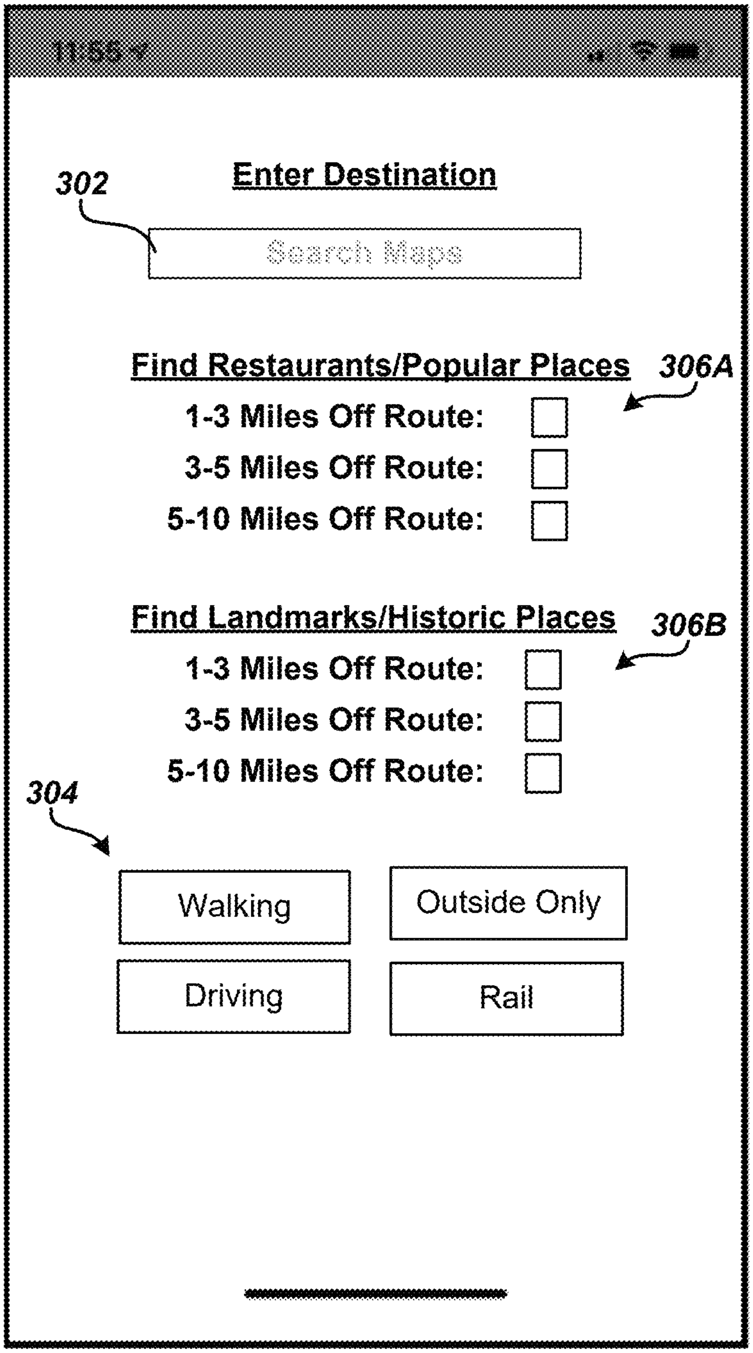
FIG. 3 is a GUI diagram showing an exemplary user interface for selection of a destination and other options in a pedestrian-oriented navigation app, according to embodiments presented herein.

FIG. 3 shows a user interface 300 of the app allowing a pedestrian 104 to select a destination for navigation, according to some embodiments. The pedestrian 104 may start entering a name for the destination, as shown at 302, such as a landmark name, business name, etc. and the app will autocomplete from mapping data, public records, GPS information etc. The pedestrian 104 may then be able to specify the travel mode, e.g., walking, driving, rail, outside only, etc., as further shown at 304. Note that the default mode may be walking and Prmay allow for routes that include sections traveled outside and sections traveled inside buildings or other structures.

When a pedestrian 104 selects a destination in the destination search 302, the pedestrian may also be provided the ability to select route/travel options through the user interface 300. For example, the pedestrian 104 may select options to view restaurants, landmarks, historical places, and or other additional locations of their choosing that are on their route/path or near or adjacent to their route/path, as shown at 306A and 306B in FIG. 3. On the routing screen, items for each selected travel and route option may appear on the map, as shown at 418A and 418B in FIG. 4A, and/or in a list, as shown at 416. The pedestrian 104 may scroll and view items in the list 416 for each route option selected. Once a route to the destination is selected, the pedestrian may be provided a chance to specify additional locations/destinations from the item lists that they want to visit enroute to their final destination.

Figure 4A:
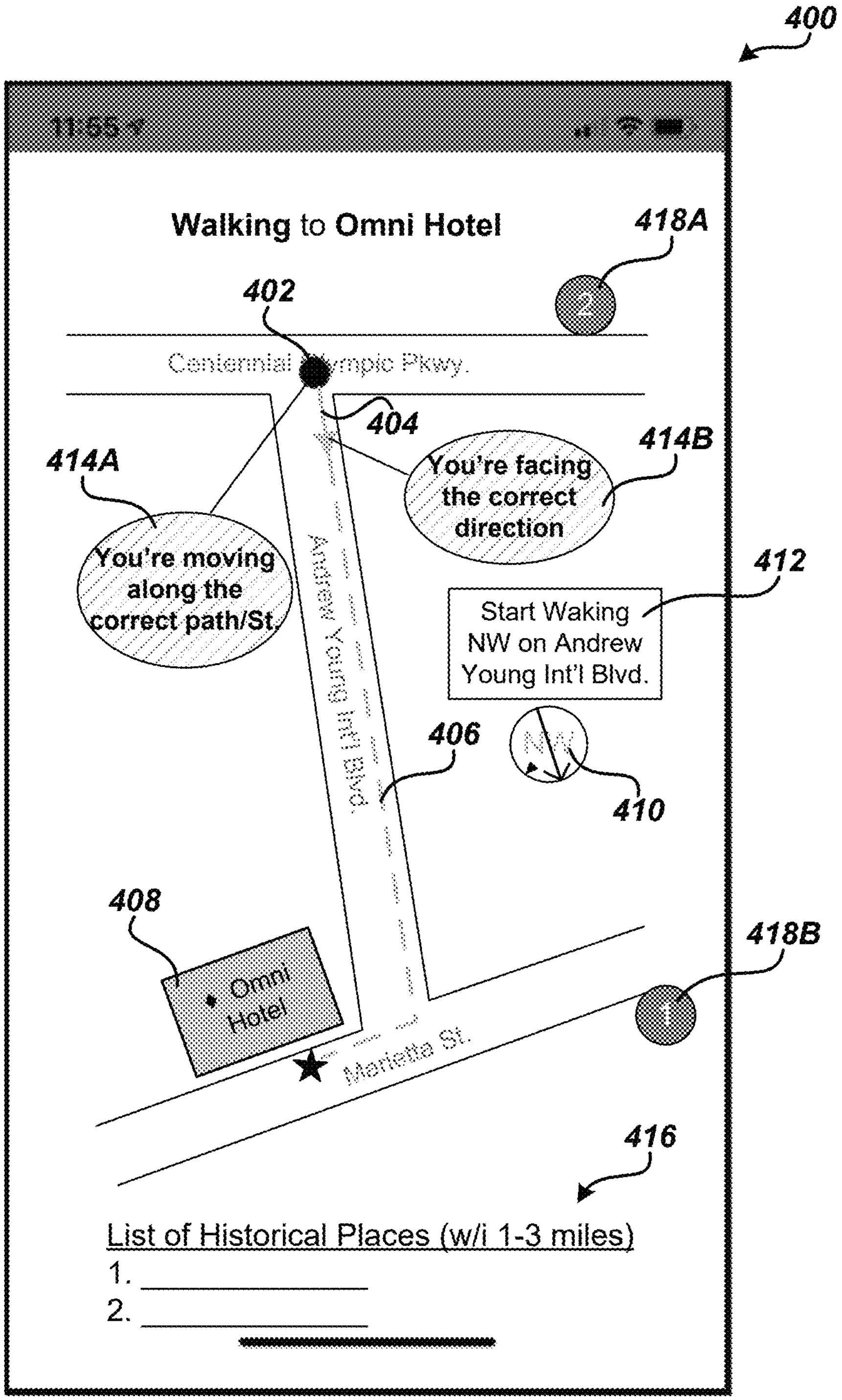
FIGS. 4A-4C are GUI diagrams showing an exemplary user interface for navigation by a pedestrian to a selected destination in a pedestrian-oriented navigation app, according to embodiments presented herein.

FIG. 4A shows a user interface 400 of the app providing navigation instructions for navigation by the pedestrian 104 to the selected destination. The navigation interface 400 shows a current location marker 402 indicating the current location of the mobile device 102 on the map, along with the determined route 406 and the selected destination 408. The navigation interface 400 also includes real-time instructions 412 for proceeding to or along the route from the current location. In some embodiments, the navigation interface 400 includes both a current directing indicator 404 indicating the current direction that the pedestrian 104 is facing/moving as well as a compass display 410 showing the correct direction to proceed. In further embodiments, the navigation interface 400 includes real-time indications to the pedestrian that they are proceeding on the correct route. For example, the app may color the current location marker 402, current direction indicator 404, route 406, destination 408, and/or other elements of the map display green in order to indicate the pedestrian 104 is proceeding along the correct route. In addition, the navigation interface 400 may include textual messages, such as textual messages 414A and 414B, that indicate that the pedestrian is facing the correct direction and moving along the correct path, as further shown in FIG. 4A.

Figure 4B:
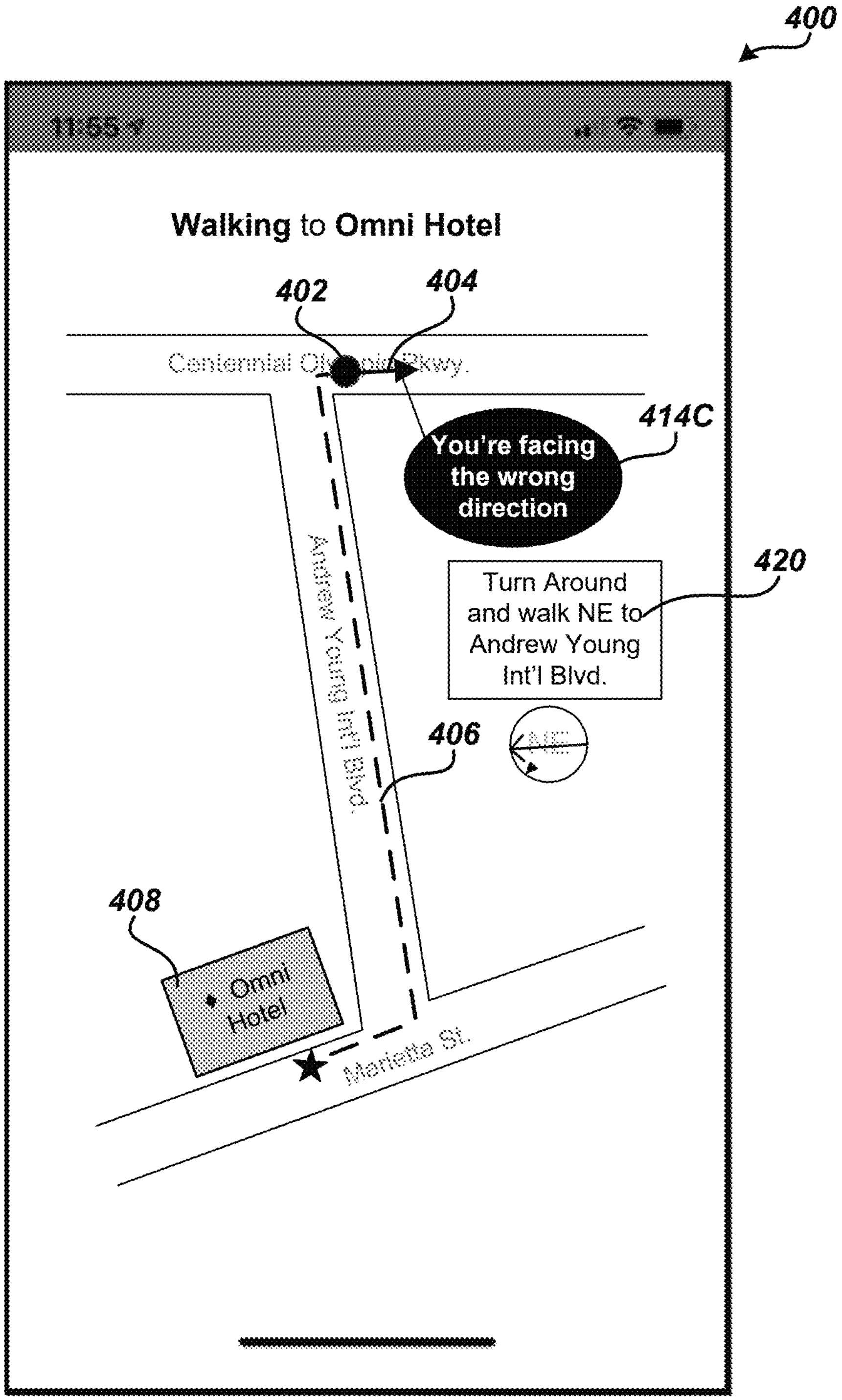
Figure 4C:
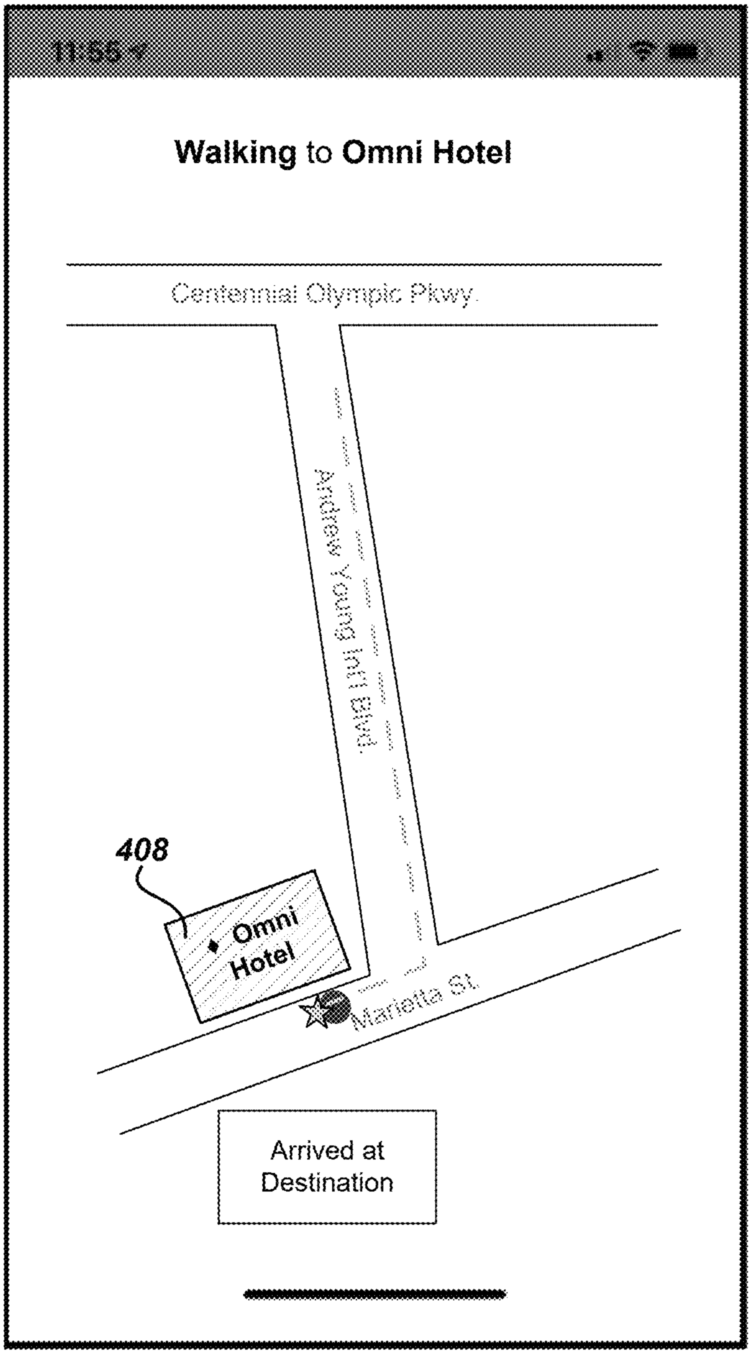

FIG. 4B shows another view of the navigation interface 400 when the pedestrian 104 has deviated from the route to the selected destination, according to further embodiments. When the pedestrian 104 deviates from the route, such as by taking a few steps in a wrong direction, the app may provide real-time indications to the pedestrian that they are deviating from the correct route. For example, the app may color the current location marker 402, current direction indicator 404, route 406, destination 408, and/or other elements of the map display red in order to indicate the pedestrian 104 is off the correct route. In addition, the user interface may include textual messages, such as textual message 414C, that indicate that the pedestrian 104 is facing the wrong direction and/or is no longer moving along the correct path, as further shown in FIG. 4B. According to embodiments, the navigation interface 400 includes textual instructions 420 for the user to return to the correct route, as further shown in the figure. FIG. 4C shows another view of the navigation interface 400 indicating that the pedestrian 104 has arrived at the destination 408, according to further embodiments.

Figure 5:
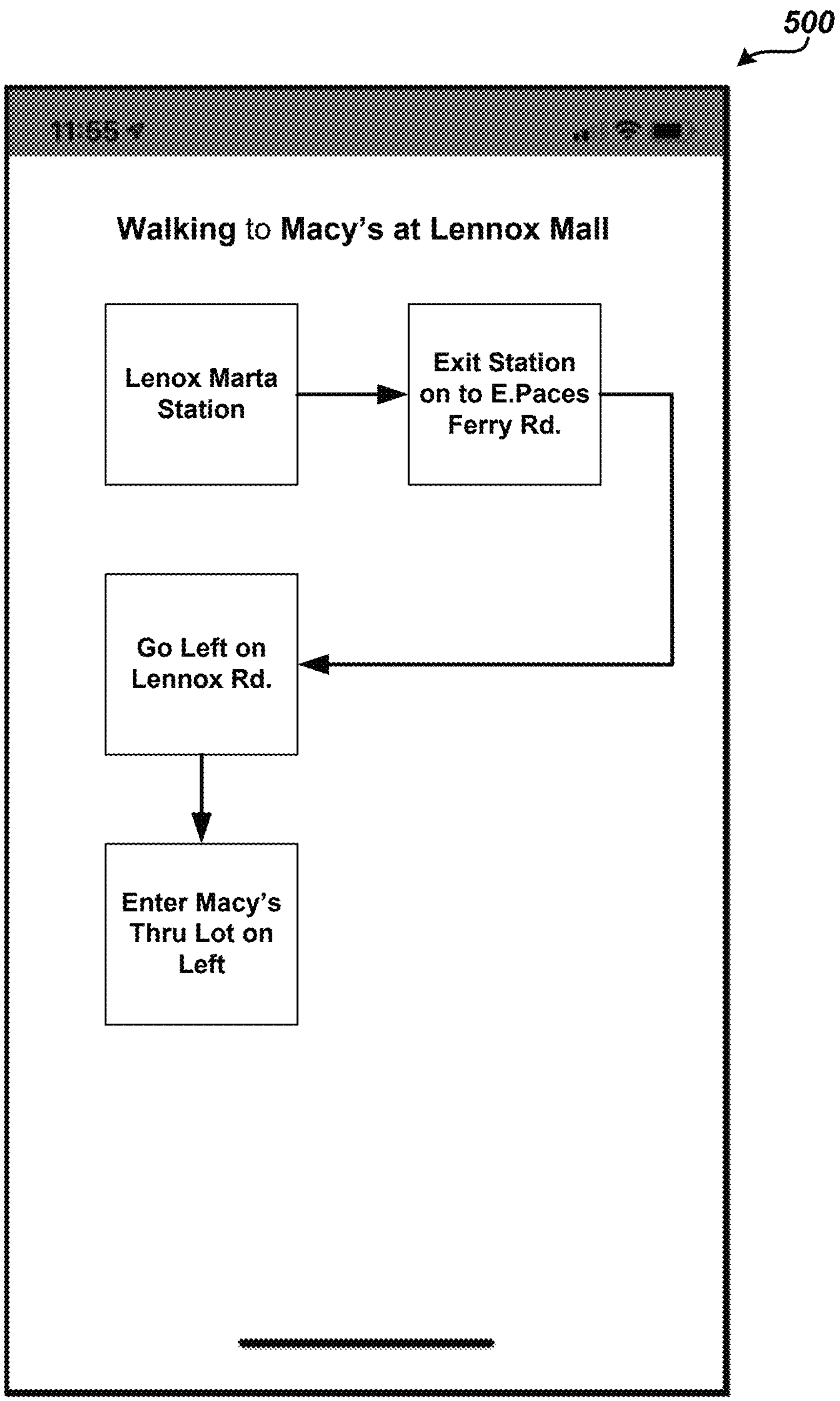
FIG. 5 is a GUI diagram showing an alternative/additional user interface for showing a summary of route navigation instructions to a selected destination in a pedestrian-oriented navigation app, including pedestrian-specific routings, according to embodiments presented herein.

FIG. 5 shows an additional/alternative user interface 500 showing an overview of instructions for a route to a retail destination from a transit station. The user interface 500 shown in the figure emphasizes the benefits of working with pedestrian-oriented navigation data 122, such as pedestrian-specific instructions to use proper exit from the transit station for the destination and non-street pathways, such as entering through the indicated parking lot.

Figure 6:
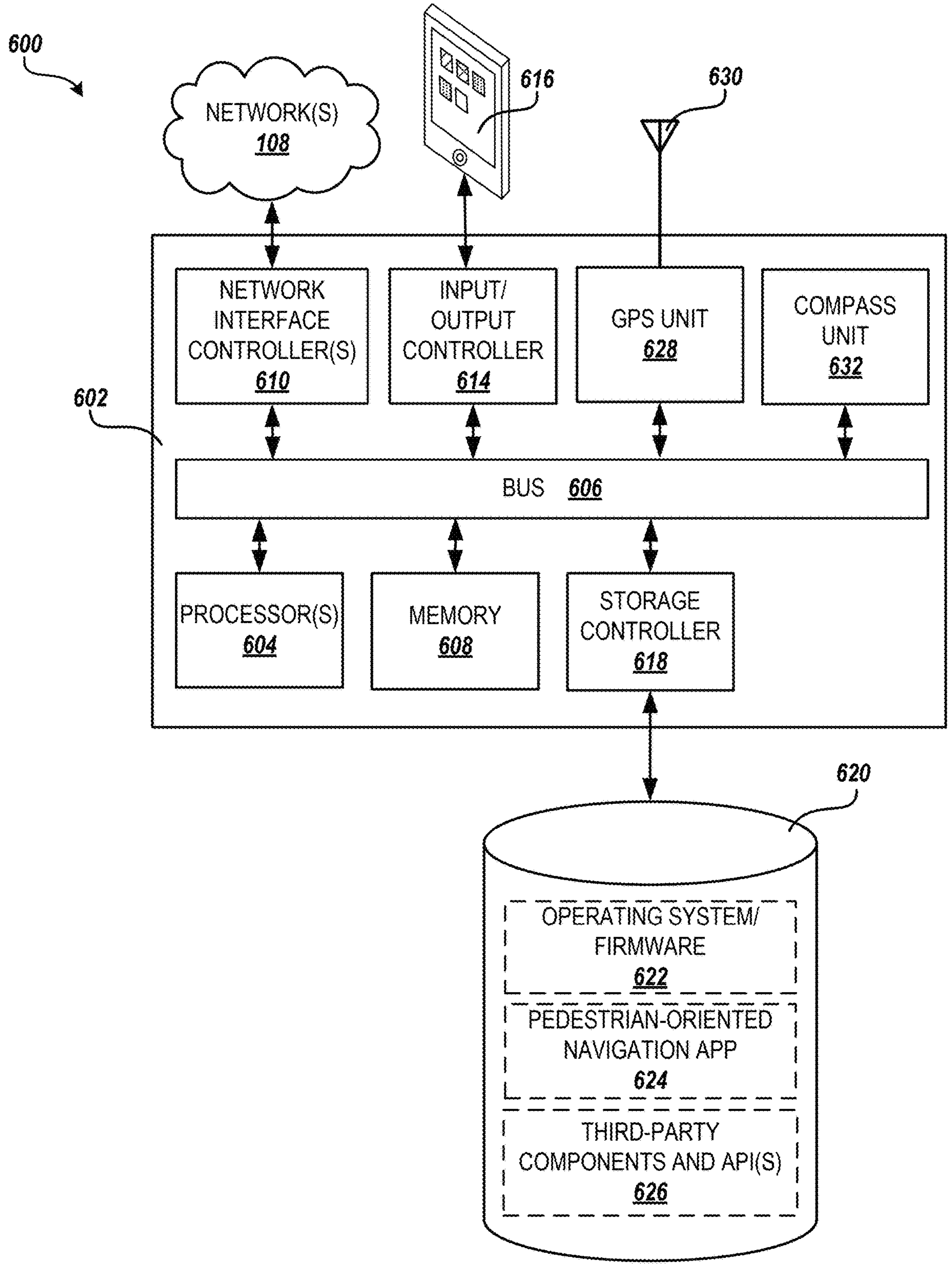
FIG. 6 is a block diagram showing an exemplary computing and software architecture for computing devices described herein.

FIG. 6 shows an example computer architecture 600 for a computing device 602 capable of executing software components described herein providing a pedestrian-oriented navigation app for a mobile device. The computer architecture 600 shown in FIG. 6 illustrates a smartphone, server, desktop computer, laptop, workstation, or other computing device, and may be utilized to execute any aspects of the app or other software components presented herein described as executing on the mobile device 102, the cloud server 120, or other computing platform. The computing device 602 may include one or more printed circuit board to which a multitude of components or devices may be connected by way of a system bus or other electrical communication paths.

The computing device 602 includes one or more processor(s) 604. The processor(s) may represent microprocessors, CPUs, processing cores, MCUs, microcontrollers, ASICs, FPGAs, and or any other component that provides processing resources to the computing device 602. For example, the processor(s) 604 may be standard programmable processors that perform arithmetic and logical operations necessary for the operation of the computing device 602. The processor(s) 604 interface and communicate with the remainder of the components and devices of the computing device 602 over a bus 606. The computing device 602 further includes a memory 608. The memory 608 may include a random access memory ("RAM") used as the main memory in the computing device 602. The memory 608 may further include a computer-readable storage medium such as a read-only memory ("ROM") or non-volatile RAM ("NVRAM") for storing basic routines that that help to startup the computing device 602 and to transfer information between the various components and devices. The ROM or NVRAM may also store other software components necessary for the operation of the computing device 602 in accordance with the embodiments described herein.

According to various embodiments, the computing device 602 may operate in a networked environment using logical connections to remote computing devices through one or more networks, such as a Wi-Fi network, a LAN, a WAN, a cellular data network, the Internet or "cloud," or any other networking topology known in the art that connects the computing device 602 to other, remote computers or computing systems, including the network(s) 108 described herein in regard to FIG. 1. The computing device 602 may include functionality for providing network connectivity through one or more network interface controllers ("NICs") 610, such as a gigabit Ethernet adapter, a Wi-Fi adapter, or an LTE data adapter. It should be appreciated that any number of NIC(s) 610 may be present in the computing device 602, connecting the computer to other types of networks and remote computer systems beyond those described herein.

The computing device 602 may also include an input/output controller 614 for interfacing with various external devices and components, such as a touchscreen display 616 of the mobile device 102, for example. Other examples of external devices that may be interfaced to the computing device 602 by the input/output controller 614 include, but are not limited to, standard user interface components of a keyboard, mouse, and display, a touchpad, an electronic stylus, a computer monitor or other display, a video camera, a printer, an external storage device, such as a Flash drive, and the like. According to some embodiments, the input/output controller 614 may include a USB controller.

The computing device 602 may be connected to one or more mass storage devices 620 that provide non-volatile storage for the computer. Examples of mass storage devices 620 include, but are not limited to, internal solid-state memory, hard disk drives, solid-state (Flash) drives, optical disk drives, magneto-optical disc drives, magnetic tape drives, memory cards, holographic memory, or any other computer-readable media known in the art that provides non-transitory storage of digital data and software. The mass storage device(s) 620 may be connected to the computing device 602 through a storage controller 618 connected to the bus 606. The storage controller 618 may interface with the mass storage devices 620 through a serial attached SCSI ("SAS") interface, a serial advanced technology attachment ("SATA") interface, a fiber channel ("FC") interface, or other standard interface for physically connecting and transferring data between computers and physical storage devices.

The mass storage device(s) 620 may store system programs, application programs, other program modules, and data, which are described in greater detail in the embodiments herein. According to some embodiments, the mass storage device(s) 620 may store an operating system/firmware 622 utilized to control the operation of the computing device 602. In some embodiments, the operating system/firmware 622 may comprise the IOS® or ANDROID™ mobile device operating systems from Apple, Inc. and Google, LLC, respectively. In further embodiments, the operating system/firmware 622 may comprise the WINDOWS® operating system from MICROSOFT Corporation of Redmond, Washington. In yet further embodiments, the operating system/firmware 622 may comprise the LINUX operating system, the WINDOWS® SERVER operating system, the UNIX operating system, or the like. The mass storage device(s) 620 may store other system or application program module and data described herein, such as the pedestrian-oriented navigation app 624, or the third-party components and APIs 626 utilized by the app and described in the various embodiments. In some embodiments, the mass storage device(s) 620 may be encoded with computer-executable instructions that, when executed by the computing device 602, perform the routine 200 described in regard to FIG. 2 for providing pedestrian-oriented navigation to a pedestrian 104 utilizing the device.

The computing device 602 may further include a GPS unit 628 that receives location information, including coordinates and elevation, from GPS satellites through one or more connected GPS antenna 630 for use by the app in accordance with the embodiments described herein. In addition, the computing device 602 may include a compass unit 632 that determines a compass orientation or direction of the device to further facilitate navigation.

It will be appreciated that the computer architecture 600 may not include all of the components shown in FIG. 6, may include other components that are not explicitly shown in FIG. 6, or may utilize an architecture completely different than that shown in FIG. 6. For example, the processor(s) 604, memory 608 and mass storage devices 620, and NIC(s) 610 of the computer architecture 600 may represent components of a System-on-a-Chip ("SoC") integrated circuit utilized in a mobile device or smartphone, virtualized resources from any number of server computers or computing devices, or generic processing resources, storage resources, and communication resources of a cloud-based computing system, with the bus 606 representing communication interlinks between the processing, storage, communication, and other computing resources in the cloud-based computing system. It is intended that all such computing architectures be included within the scope of this application.

Based on the foregoing, it will be appreciated that technologies for providing a pedestrian-oriented navigation app for a mobile device are presented herein. The above-described embodiments are merely possible examples of implementations set forth for a clear understanding of the principles of the present disclosure. Many variations and modifications may be made to the above-described embodiments without departing substantially from the spirit and principles of the present disclosure. All such modifications and variations are intended to be included within the scope of the present disclosure, and all possible claims to individual aspects or combinations and sub-combinations of elements or steps are intended to be supported by the present disclosure.

The logical steps, functions or operations described herein as part of a routine, method or process may be implemented (1) as a sequence of processor-implemented acts, software modules or portions of code running on a microcontroller, computing device, or other computer system and/or (2) as interconnected machine logic circuits or circuit modules within the microcontroller, computing device, or other computer system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

What is claimed is:

1. A method for a mobile device to provide instructions to a pedestrian for navigating to a destination, the method comprising steps of:

receiving, through a user interface of the mobile device, destination information from the pedestrian;

accessing, by the mobile device, pedestrian-oriented mapping data and routing for the navigation by walking of the pedestrian to the destination based on the destination information;

determining, by the mobile device, a current location and direction of the pedestrian based upon GPS data and compass data retrieved from the mobile device;

displaying, on the user interface of the mobile device, the current location and direction of the pedestrian and a route for the pedestrian to walk to the destination based on the pedestrian-oriented mapping data and routing; and upon detecting that the pedestrian has deviated from the route, altering, by the mobile device, the display on the user interface to alert the pedestrian to the deviation, the altering of the display comprising providing textual messages to the pedestrian comprising real-time instructions for the pedestrian for returning to the route.

2. The method of claim 1, wherein the altering of the display further comprises changing an original color of one or more of indicators on the display of the mobile device of the current location and direction of the pedestrian and the route as displayed on the user interface to another color to indicate the deviation from the route.

3. The method of claim 2, further comprising, upon detecting that the pedestrian has returned to the route, changing the another color of the one or more of indicators of the current location and direction of the pedestrian and the route as displayed on the user interface back to the original color to indicate return to the route.

4. The method of claim 3, wherein detecting that the pedestrian has deviated from the route, further comprises providing, by the mobile device, corrected directions via an audio message.

5. The method of claim 1, wherein the pedestrian-oriented mapping data comprises one or more of steps, stairs, elevators, escalators, and ramps with associated elevation changes for each, and wherein the route for the pedestrian to walk to the destination comprises instructions to the pedestrian to move up or down levels of a structure.

6. The method of claim 1, wherein detecting that the pedestrian has deviated from the route comprises detecting that the pedestrian is moving in a wrong direction.

7. The method of claim 1, wherein the display on the user interface may further comprise additional locations on or near the route to the destination based upon selections made by the pedestrian through the user interface of the mobile device.

8. The method of claim 1, wherein detecting that the pedestrian has deviated from the route, further comprises providing, by the mobile device, corrected directions via an audio message.

9. A non-transitory computer-readable medium encoded with computer-executable instructions that, when executed by a processor of a mobile device, cause the mobile device to:

receive destination information from a pedestrian utilizing a user interface of the mobile device;

access pedestrian-oriented mapping data and routing for navigation by walking of the pedestrian to a destination based on the received destination information;

determine a current location and direction of the pedestrian based upon GPS data and compass data retrieved from the mobile device;

display the current location and direction of the pedestrian and a route for the pedestrian to walk to the destination on the user interface based on the pedestrian-oriented mapping data and routing;

detect whether the pedestrian has deviated from the route based upon the current location and direction of the pedestrian; and upon detecting that the pedestrian has deviated from the route, alter the display on the user interface to alert the pedestrian to the deviation, the altering of the display comprising providing textual messages to the pedestrian comprising real-time instructions for the pedestrian for returning to the route.

10. The non-transitory computer-readable medium of claim 9, further encoded with computer-executable instructions that cause the mobile device to repeat the determining, displaying, detecting, and alerting steps until the pedestrian has arrived at the destination.

11. The non-transitory computer-readable medium of claim 9, wherein the altering of the display further comprises changing an original color of one or more of indicators of the current location and direction of the pedestrian and the route as displayed on the user interface to another color to indicate the deviation from the route, and wherein, upon detecting that the pedestrian has returned to the route, changing the another color of the one or more of indicators of the current location and direction of the pedestrian and the route as displayed on the user interface back to the original color to indicate return to the route.

12. The non-transitory computer-readable medium of claim 11, wherein detecting that the pedestrian has deviated from the route, further comprises providing, by the mobile device, corrected directions via an audio message.

13. The non-transitory computer-readable medium of claim 9, wherein the pedestrian-oriented mapping data comprises one or more of steps, stairs, elevators, escalators, and ramps with associated elevation changes for each, wherein the route for the pedestrian to walk to the destination comprises instructions to the pedestrian to move up or down levels of a structure.

14. The non-transitory computer-readable medium of claim 9, wherein detecting that the pedestrian has deviated from the route comprises detecting that the pedestrian is moving in a wrong direction.

15. The non-transitory computer-readable medium of claim 9, wherein detecting that the pedestrian has deviated from the route, further comprises providing, by the mobile device, corrected directions via an audio message.

16. A mobile device comprising:

a processor;

a display operably connected to the processor and configured to present a user interface to a user of the mobile device;

a GPS module operably connected to the processor and configured to provide a current location of the mobile device to the processor;

a compass module operably connected to the processor and configured to provide a current direction of the mobile device to the processor; and a memory operably connected to the processor and containing computer-executable instructions that, when executed by the processor, cause the mobile device to:

receive destination information from the user utilizing the user interface, access pedestrian-oriented mapping data and routing for navigation by walking of the user to a destination based on the received destination information, retrieving the current location and direction of the mobile device from the GPS module and the compass module, display the current location and direction of the mobile device and a route for the user to walk to the destination on the user interface based on the pedestrian-oriented mapping data and routing, detect whether the user has deviated from the route based upon the current location and direction of the mobile device, and upon detecting that the user has deviated from the route, alter the display on the user interface to alert the user of the deviation, the altering of the display comprising providing textual messages to the pedestrian comprising real-time instructions for the pedestrian for returning to the route; and repeat the retrieving, displaying, detecting, and alerting steps until the user has arrived at the destination.

17. The mobile device of claim 16, wherein the altering of the display further comprises changing a color of one or more of indicators of the current location and direction of the mobile device and the route as displayed on the user interface to indicate the deviation from the route.

18. The mobile device of claim 17, wherein detecting that the pedestrian has deviated from the route, further comprises providing, by the mobile device, corrected directions via an audio message.

19. The mobile device of claim 16, wherein the pedestrian-oriented mapping data comprises one or more of steps, stairs, elevators, escalators, and ramps with associated elevation changes for each, and wherein the route for the pedestrian to walk to the destination comprises instructions to the pedestrian to move up or down levels of a structure.

20. The mobile device of claim 16, wherein detecting that the pedestrian has deviated from the route, further comprises providing, by the mobile device, corrected directions via an audio message.

* * * * *